United States Patent [19]
Barmatz et al.

[11] Patent Number: 6,034,363
[45] Date of Patent: Mar. 7, 2000

[54] UNIFORM BATCH PROCESSING USING MICROWAVES

[75] Inventors: Martin B. Barmatz, La Crescenta; Henry W. Jackson, LaVerne, both of Calif.

[73] Assignee: California Institute of Technology, Pasadena, Calif.

[21] Appl. No.: 08/798,209

[22] Filed: Feb. 10, 1997

[51] Int. Cl.[7] .................................................. H05B 6/74
[52] U.S. Cl. ......................... 219/750; 219/745; 219/756
[58] Field of Search .................................. 219/750, 746, 219/748, 745, 756, 695, 696, 697

[56] References Cited

U.S. PATENT DOCUMENTS

| | | | |
|---|---|---|---|
| 3,316,380 | 4/1967 | Pansing | 219/745 |
| 3,597,566 | 8/1971 | Johnson et al. | 219/750 |
| 4,119,824 | 10/1978 | Jeambey | 219/746 |
| 4,276,462 | 6/1981 | Risman | 219/748 |
| 4,323,745 | 4/1982 | Berggren | 219/750 |
| 4,760,230 | 7/1988 | Hassler | 219/750 |
| 4,908,486 | 3/1990 | Fry | 219/748 |

FOREIGN PATENT DOCUMENTS

WO 87/04314  7/1987  WIPO ................................. 219/750

*Primary Examiner*—Philip H. Leung
*Attorney, Agent, or Firm*—Fish & Richardson P.C.

[57] ABSTRACT

A microwave oven and microwave heating method generates microwaves within a cavity in a predetermined mode such that there is a known region of uniform microwave field. Samples placed in the region will then be heated in a relatively identical manner. Where perturbations induced by the samples are significant, samples are arranged in a symmetrical distribution so that the cumulative perturbation at each sample location is the same.

18 Claims, 4 Drawing Sheets

UNIFORM BATCH PROCESSING USING MICROWAVES

ORIGIN OF INVENTION

The invention described herein was made in the performance of work under a NASA contract, and is subject to the provisions of Public Law 96-517(35 USC 202) in which the Contractor has elected to retain title.

FIELD OF THE INVENTION

The present invention defines an improved apparatus and method for microwave heating. More specifically, the present invention defines techniques for simultaneous uniform heating of a plurality of objects inside a microwave cavity.

BACKGROUND AND SUMMARY OF THE INVENTION

There are many applications for using microwave energy to heat objects. Microwave ovens are commonly used to heat food. There are also many scientific and industrial applications of microwave heating.

Microwave heating takes place in two basic processes depending on the object's properties. Where the object to be heated is a dielectric, microwave power is dissipated within the nonconducting medium through a volumetric heating process. Where the object is a conductor, microwave heating takes place within a small surface penetration depth which depends on the dielection properties of the material and the microwave frequency.

Microwave heating has a number of advantages over other techniques. The air and other materials around the object are generally not heated as they would be in conventional ovens. This reduces wasted energy. Moreover, conventional ovens apply heat to the outside of an object, relying on conduction from the outside surface to heat the object's interior. The result is less heating deep inside the object than near the surface. A number of problems are caused by this non-uniform application of heat. These include cracking from heat gradients, and scorching or burning of the surface of the object. In contrast, microwaves can heat the interior and exterior of an object in a relatively uniform manner.

Despite these advantages, microwave heating has some disadvantages. Heating is uniform only under special uniform conditions that depend on the modes excited in the oven as well as the composition, shape, size and location of the sample in the oven. Non-uniform fields will result in non-uniform heating. Hence some areas inside an object will be heated more than others; or two different objects will be heated by different amounts. This is due to two primary factors: microwave fields are inherently non-uniform within the oven, and objects within the oven will distort the fields near the object. While the inherent non-uniformities are predictable, distortions from objects within are difficult to predict and quantify. This is because these distortions, or perturbations, depend on the dielectric properties and shapes of the objects in complex ways.

Non-uniform heating limits the usefulness of microwaves in both consumer and industrial applications. In consumer applications, the result is often overcooking and/or undercooking of portions of food in the oven. In some industrial applications, such as batch processing of materials and products at high temperatures, non-uniform heating results in non-uniform products. This occurs when the desired processing depends on the samples receiving a precise amount of heat.

There have been numerous attempts to overcome the problem of non-uniform microwave heating. In one technique, objects are moved within the oven during heating to expose different objects, and different parts of each object, to varying microwave energy levels. Another method is to excite a large number of resonant modes within the microwave oven. This can be done, for example, by introducing a moving deflector into the microwave field. These approaches often do not achieve a satisfactory level of uniformity, particularly in high temperature industrial applications.

The inventors of the present invention have devised a new way to address the problem of non-uniform heating in microwave ovens. The present invention provides a way to configure a microwave oven so that the resonant mode of the microwaves, and the particular physical characteristics of the oven and samples, result in substantially identical field configurations surrounding all the samples. This results in the same processing conditions for each sample. The primary obstacle preventing uniform batch processing has been the complex perturbations in microwave fields created by the heated object's shape and dielectric properties. These perturbations would have to be quantified for each spatial location in order to account for these variations. For most applications, these distortions are seemingly intractable to quantify.

The inventors of the present invention have recognized that a fundamental understanding of the microwave/sample interactions could result in the prediction of a set of experimental parameters that would lead to uniform batch processing.

The present invention arises from the inventors' discovery of a way to take advantage of the symmetry of certain microwave and sample configurations that can produce uniform heating of multiple samples.

In a preferred embodiment of the invention the microwave mode of excitation and cavity shape are configured so as to generate predictable regions of identical microwave field strength. Samples placed in these regions will generally receive equal amounts of microwave energy and heating. However, larger samples that are close to each other introduce additional perturbations in the microwave fields of the other samples in the oven. In general, microwave fields at other sample locations are significantly affected by these disturbances. In the present invention, the perturbations induced by adjacent samples facilitate instead of destroy uniform processing conditions.

According to one aspect of the invention, a microwave cavity is configured to have known regions where the microwave field patterns would be almost identical without the samples in the cavity. This requires the selection of a particular cavity shape and microwave resonant mode. Then the samples are placed in specific geometrically symmetrical locations. This particular arrangement produces a modified microwave field configuration due to the sample-induced perturbations at every sample location. In this carefully determined configuration, symmetry in the perturbations caused by all of the samples will be identical for each sample location. This eliminates the need to calculate and predict the exact perturbations caused by each sample. Each sample will be heated in a similar manner under these conditions.

The present invention uses a fundamental understanding of the microwave/material interactions to produce uniform batch processing conditions employing techniques which are not taught or suggested by the prior art. According to the present invention, the sample-induced perturbations are not necessarily quantified, but nevertheless are used to create identical perturbations at each sample location. A number of new applications requiring uniform batch processing of materials are now possible using the invention. These applications may now take advantage of the many benefits of microwave heating over conventional heating processes.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

A presently preferred embodiment of the invention is set forth herein with reference to the accompanying drawings. The invention provides a technique for heating samples within a microwave oven in an identical manner. In one embodiment of the invention, cylindrical samples are processed in a cylindrical cavity. The samples are placed in regions determined to have identical microwave energy patterns for an empty cavity. Where significant perturbations are caused by the samples, the samples are arranged within these regions so as to generate symmetrical microwave perturbations for each sample location. This results in uniform batch processing of the samples.

Figure 1:
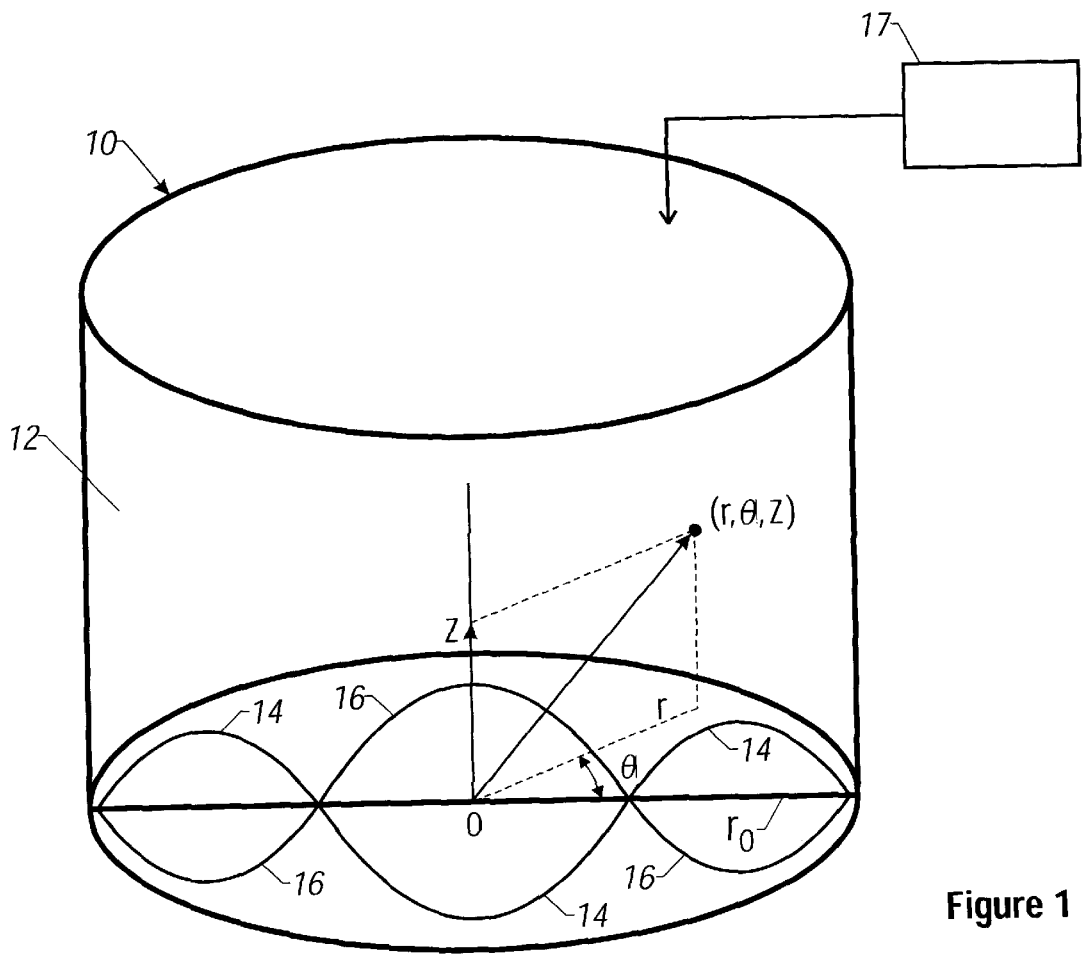
FIG. 1 shows a diagram of a cylindrical microwave oven and a definition of spatial coordinates therein.

FIG. 1 shows a cylindrical microwave oven 10 used in one embodiment of the invention. Locations within the oven 10 will be defined hereinafter using a cylindrical coordinate system. Each location is defined by three parameters (r, θ, z); r is the radial distance from the origin "0"; θ is the azimuthal angle; and z is the distance in the axial (vertical) direction from a zero point. This embodiment utilizes a cylindrical microwave cavity 12 excited by microwaves generated by microwave unit 17, in a single transverse magnetic ($TM_{0n0}$) mode.

The $TM_{0n0}$ mode of a cylindrical cavity is an electromagnetic standing wave where the magnetic field vector is always perpendicular to the z axis; that is, transverse to the z axis. More specifically, the magnetic field vector in this case is in the θ-direction; that is, the magnetic field vector is tangent to a circle concentric with the cylindrical cavity. For this mode, the electric field vector points in the z-direction at any point inside the cavity. For an ideal cavity where the walls are perfectly electrically conducting, the tangential component of the electric field satisfies the boundary conditions that it vanishes along the inside walls. For typical, real, non-ideal cavities, this boundary condition is approximately satisfied.

For any resonant mode of a cylindrical cavity, the electric field can be described by a Bessel function, which is an oscillating function that decreases in amplitude at each period. In the general case, a transverse magnetic (TM) wave is designated by "$TM_{LNM}$". The subscript L describes the angular dependence or the variation in the electric field as a function of θ; L is also the order of the Bessel function. The subscript N is the number of nodes (zeros) in the radial direction in the chamber, not including the origin at N=0. The subscript M describes the z dependence, or variation in the z direction.

The $TM_{0N0}$ modes depend entirely on the radial position (r) and, hence, are a special class of the $TM_{LNM}$ modes. These $TM_{0N0}$ modes have no θ or z dependence. This characteristic greatly simplifies the analysis. Electric field maxima for these modes in the empty cavity 12 occur at the origin, zero, and on cylindrically shaped surfaces at specific radial positions. The excited modes and the radius of the cavity determine where these field maxima and minima lie. The electric field couples to and heats samples that are poor electrical conductors and are characterized as lossy dielectrics. The magnetic field couples to and heats samples that are good electrical conductors.

Figure 2:
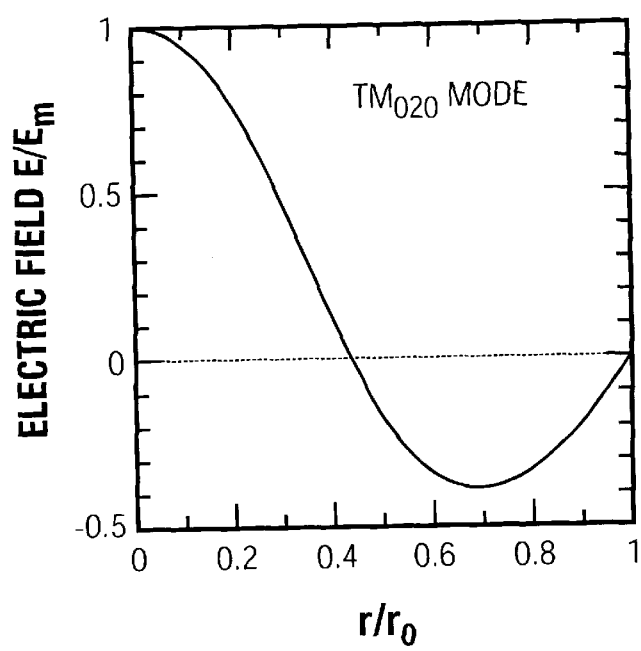
FIG. 2 is a graph showing of the variation in electric field as a function of radius within the microwave cavity for microwave energy in the $TM_{020}$ mode.

One embodiment using the $TM_{020}$ mode is shown in FIG. 2. In this mode, an empty cavity will have a maximum negative electric field along a cylindrically shaped surface. This cylinder is defined by $r/r_0$ approximately equal to 0.6941, where $r_0$ is the radius of the cavity. This radial position is where one negative electric field maximum occurs in the Bessel function describing the $TM_{020}$ wave; another occurs at the center, where r=0.

The cylindrical surface defined by $r/r_0 \approx 0.6941$ can have substantially the same field strength everywhere so long as there are no significant perturbations associated with openings in the cavity walls or materials within the cavity.

Where the samples are small and relatively far apart, perturbations caused by the samples can be ignored. In many practical instances, however, the samples can be sufficiently large and close to each other to cause significant sample-induced perturbations. These perturbations are compensated for by the invention.

If the samples to be processed are primarily conductors, instead of lossy dielectrics, they will couple to the magnetic field. Accordingly, the samples should be placed at a radial position that corresponds to a relative maximum magnetic field. For a $TM_{0N0}$ mode, this maximum will occur where the spatial rate of change of the electric field is a relative maximum. The slope of the Bessel function representing the $TM_{020}$ field in FIG. 2 can be calculated to derive these points, i.e., $r/r_0 \approx 0.3336$ and $r/r_0 \approx 0.9658$.

In the embodiment having lossy dielectric samples, and where the $TM_{020}$ mode is excited, the above-described cylinder of maximum electric field ($r/r_0 \approx 0.6941$) is chosen as a location to place samples for microwave processing. This region is desirable because it has a maximum electric field to maximize heating of the samples. Also, since the region has an essentially uniform electric field, each small sample placed in this region receives equal and uniform microwave energy. This uniform heating would depend on the relative size of the sample as compared to the size of the region of uniform electric field. Since $r/r_0$_0.6941 is an area of approximately zero slope, there is almost no variation in field strength in this region. However, the larger the sample, the greater the non-uniformity of field across the area of the sample. For example, if the sample extended from $r/r_0 \approx 0.6$ to 0.8, it would be heated to a greater degree at its center than near its edges. The acceptable amount of variation will depend on the specific application.

Another factor is the variation in conduction at the surface of an object versus its center. Normally there is too much conduction at the object's surface. In the embodiment shown in FIG. 5, the field is zero at $r/r_0=0.38$ and 0.73. Due to conduction it would be desirable to put large samples at these positions where the field is zero. The result is that the object will be getting less heating near the center and more near the surface, where heat is radiated faster. The result is a balance of energy applied versus heat conduction. Such a configuration relies on conduction to balance out the amount of heating at the surface versus the center. Also, it is possible to use more than one microwave mode simultaneously. By proper choice of the mode, the microwave field can be modified to make it more uniform in the cavity. This would be particularly advantageous in minimizing non-uniformity within larger samples.

In one embodiment, samples are symmetrically positioned in a region of relatively uniform electric field. For example, this may comprise the cylindrical surface defined by $r/r_0 \approx 0.6941$. This location is preferred, in this mode, because the electric field is at a maximum and the slope is zero; however, other areas could be used. For example, the region $r/r_0 \approx 0.2$ could be used. Here, the electric field is larger, but so is the slope. This places greater constraints on the size and positioning of samples since the greater slope means greater variations in the electric field at locations nearby $r/r_0 \approx 0.2$.

Assuming the samples are all in a region of relatively uniform electric field, sample-induced perturbations can produce non-uniform fields for the samples. It is known that samples will distort the electric field in complex ways. For example, where the samples are within about two sample diameters of each other, significant perturbations from neighboring samples will occur. Beyond this separation, since the field strength decreases rapidly, it may be possible to ignore such perturbations.

The amount and shape of this distortion depends on the size and shape of each sample as well as its location within the cavity. If the exact nature of the distortion were known, samples could be positioned in various known locations where the fields will be equal. However, calculating the exact perturbation caused by samples in a microwave cavity has proved to be intractable for most applications. This has necessitated other, less-than-satisfactory, approaches in an attempt to produce an equal heating of multiple samples. These include the above-discussed techniques such as moving the sample during the heating, or exciting a high number of resonant modes.

In accordance with one embodiment of the present invention, in order to reduce non-uniformities due to sample-induced perturbations, the samples are placed in a particular arrangement within the region of equal electric field. This particle arrangement produces symmetrical sample-induced perturbations.

Figure 3:
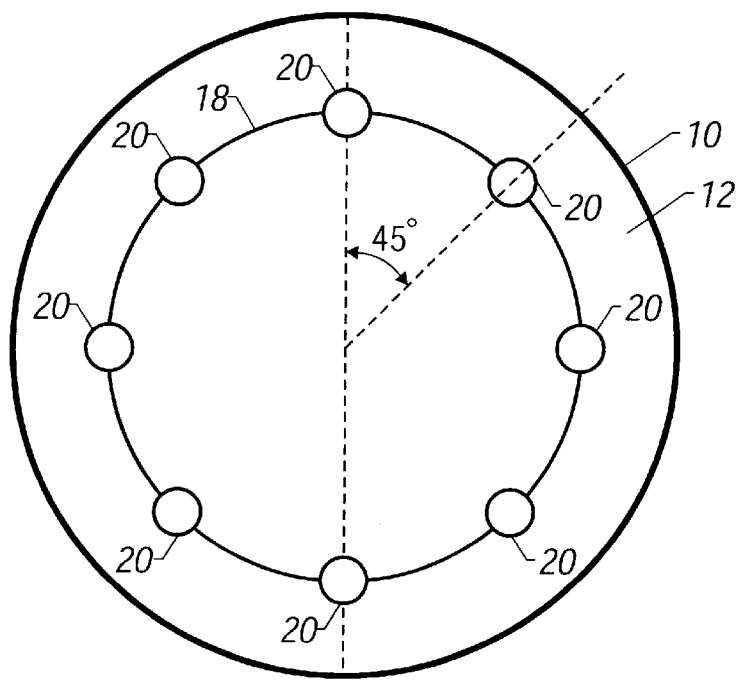
FIG. 3 shows a microwave oven with samples arranged for uniform batch processing in accordance with one embodiment of the invention.

FIG. 3 shows such an arrangement of eight samples 20 in a microwave cavity in accordance with a preferred embodiment of the invention. The electric field used is the one described with reference to FIG. 2, generated by the $TM_{020}$ mode. One planar region within microwave cavity 12 is defined by $r/r_0 \approx 0.6941$ and shown as circle 18. Circle 18 represents a region of uniform electric fields in a single plane defined by a single value of z. As described above, $r/r_0 \approx 0.6941$ for all possible values of z is a cylinder in 3 dimensions.

Figure 7:
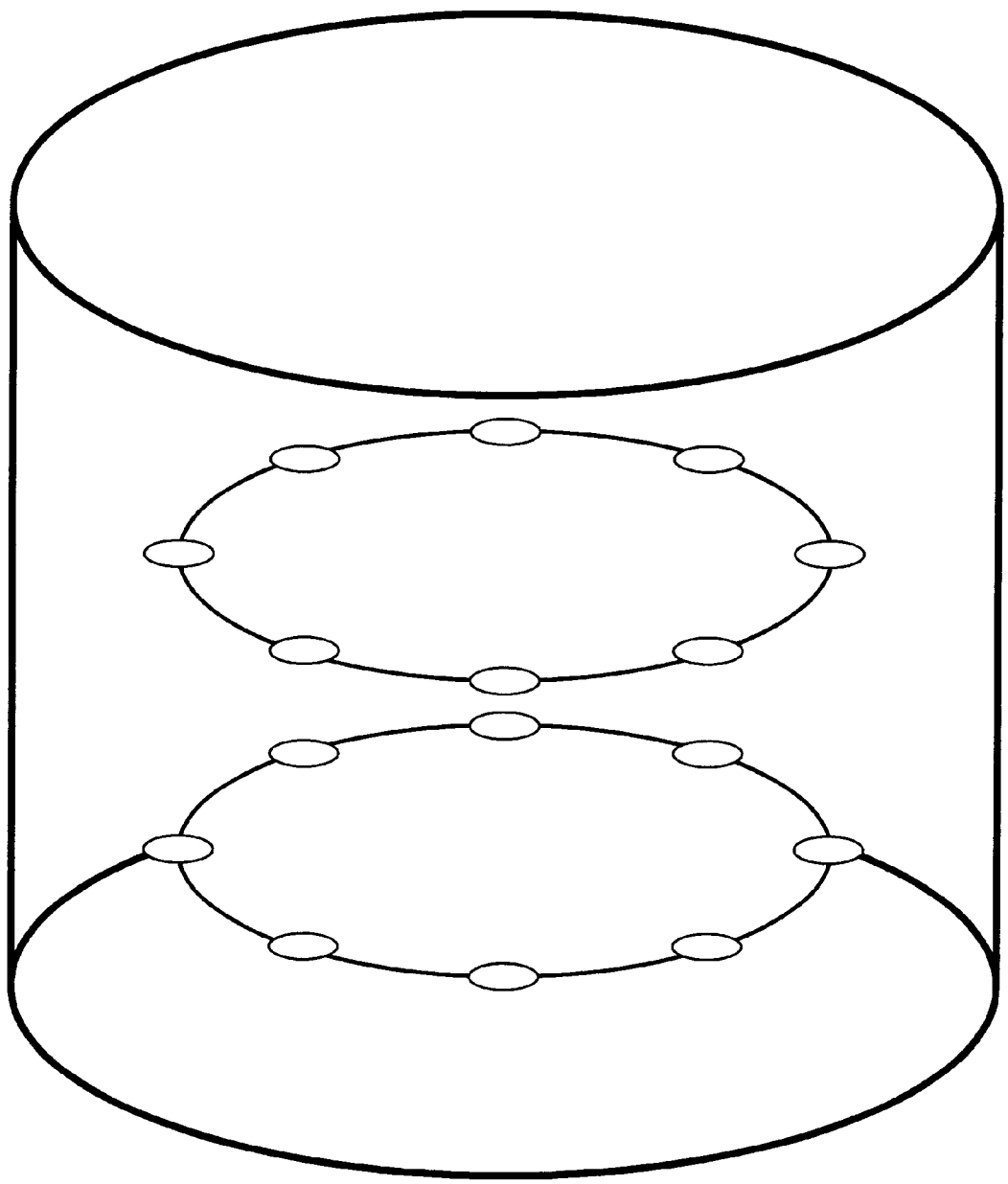
FIG. 7 shows another embodiment of the invention where the samples are placed in two planes.

There is no z dependence in the $TM_{020}$ mode since the z parameter M is zero. Thus, samples may be arranged as shown in FIG. 3 at other heights (z values). That is, a plurality of regions of equal electric field will exist simultaneously at various values of z. FIG. 3 illustrates region 18 for a single value of z. FIG. 7 shows an alternative arrangement where samples are placed at two different z values.

The present inventors have discovered that samples can be arranged so that identical sample-induced perturbation of the electric field will occur at each sample location. These perturbations are approximately identical for similarly shaped samples 20. When they are disposed in a generally symmetrical arrangement, such as shown in FIG. 3. In the present embodiment, each sample 20 has a cylindrical shape and is placed throughout the cavity 12 along the circle $r/r_0 \approx 0.6941$ and at angular positions defined by $\theta=2\pi/S$, where S is the number of samples. In FIG. 3, S is equal to 8. Different numbers of samples may be used in the configuration shown in FIG. 3 as long as they are disposed radially according to $\theta=2\pi/S$. Each sample 20 is in identical proximity to the other samples due to the symmetric positioning defined by the choice of $\theta$.

The result of this sample positioning is that the sample-induced perturbations of the electric field at each sample position caused by all the other samples will be approximately the same. Consequently, since each sample 20 has the same geometry and is subjected to the same field, all the samples will be heated by approximately the same amount.

The optimum processing parameters required for any given application will depend on many factors including sample size and shape. Some of these parameters can be determined empirically. This is because an exact theoretical model of the process is difficult to derive. These processing parameters include the real and imaginary parts of the dielectric constant. The technique of the invention assumes that there are no significant perturbations associated with non-uniformities in the walls of the cavity. For example, it is assumed that the cavity has no significant holes or slots.

As sample size increases, sample-induced perturbations in the electric fields will also increase. At some point, the cylindrical surface defining the maximum electric field for the $TM_{020}$ mode may be slightly shifted. For example, larger samples may shift the radial location of the maximum field point. Thus, to fine-tune the optimal sample location, it may be necessary to experimentally determine the $r/r_0$ cylindrical surface that produces the largest energy absorption (heating) of all the samples. For example, this determination may be made by measuring the temperature of samples in various locations to determine the precise location where samples reach the highest temperature (that is, receive the most heating.)

The invention can also be applied in other embodiments by using the symmetry associated with other excitation modes; as well as by using other sample and microwave cavity geometries. For instance, increasing the value of the mode index N will produce (n–1) cylindrical surfaces corresponding to electric field maxima.

Figure 4:
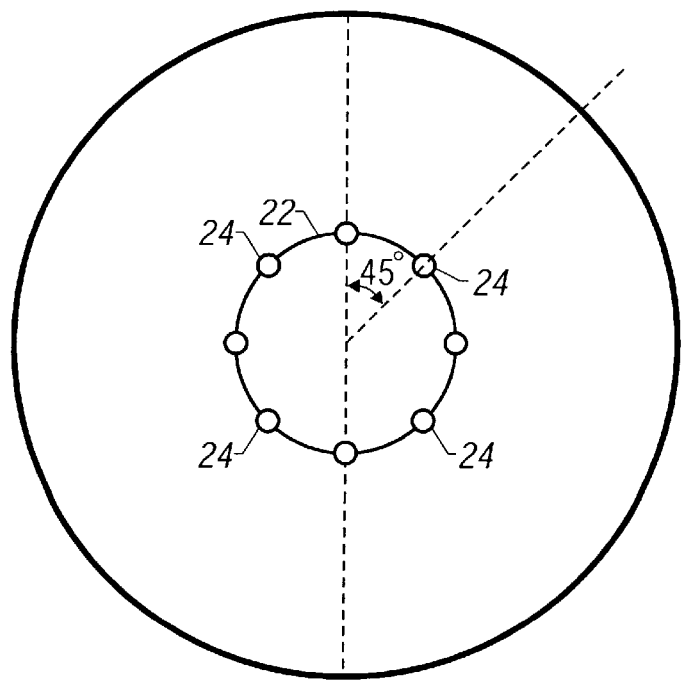
FIG. 4 shows a microwave oven with samples disposed therein for uniform batch processing in accordance with another embodiment of the invention.

FIG. 4 shows another embodiment of the present invention where the samples are placed in region 22 defined by $r/r_0 \approx 0.3336$, where the magnetic field is a maximum. In this embodiment, the region of maximum magnetic field is used because the samples 24 are primarily conductors.

Figure 5:
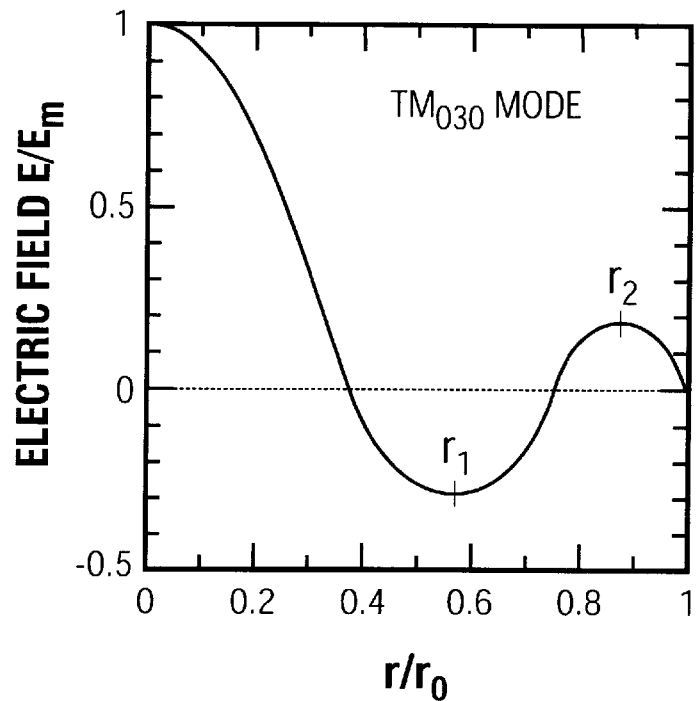
FIG. 5 shows electric field strength as a function of radial position in a cylindrical cavity excited in the $TM_{030}$ mode.
Figure 6:
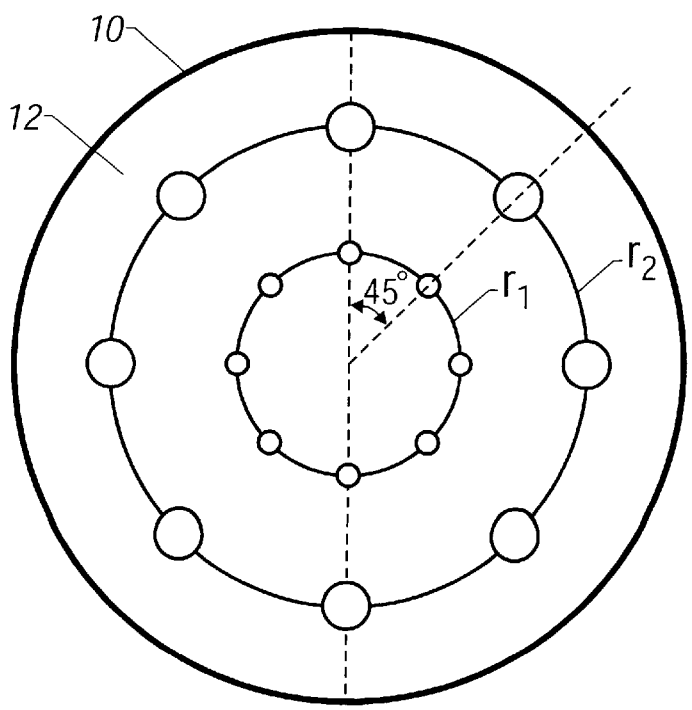
FIG. 6 shows a microwave oven and samples configured for uniform batch processing in accordance with another embodiment of the invention, where the cavity is excited in the $TM_{030}$ mode characterized in FIG. 5.

FIG. 5 shows the electric field for the $TM_{030}$ mode where electric field maxima occur at $r/r_0=0$, 0.4428 and 0.8107. In this embodiment, uniform regions of the electric field exist at the cylindrical surfaces defined by these $r/r_0$ values. Where perturbations caused by the samples are significant, samples are preferably arranged symmetrically in either of these regions, as shown in FIG. 6. Note that both regions can be used simultaneously. One batch of samples in one region will be processed identically, and a second batch in a second region will also be processed identically. However, the first and second batches will not be processed identically because of the differences in electric field strength, and also because of differences in perturbations caused by samples in the adjacent regions. This difference may be partially compensated by exposing the samples in the region of weaker field strength for a correspondingly longer time in the microwave oven. Also, these differences could be corrected by moving the samples through the cavity at different speeds, or otherwise exposing them for different times.

Microwave couplers can introduce asymmetries in the fields. Hence, the microwave couplers in the oven should be positioned and configured so as to avoid asymmetries.

FIG. 7 shows an embodiment having samples disposes in two planes. Here each of two groups of the samples are positioned in a symmetrical arrangement as in the previous embodiment. Each group is at a different z axis location. For the $TM_{0n0}$ mode described above, there is no z axis dependence. Thus, the two sets of samples will be exposed to about the same magnitude of electric field. The samples within each group will also experience identical fields due to the symmetry principle described above.

Although only a few embodiments have been described in detail above, those having ordinary skill in the art will certainly understand that many modifications are possible in the preferred embodiment without departing from the teachings thereof. For example, many different cavity shapes and sample shapes may be used. Also, different modes of microwave excitation may be employed. All such modifications are intended to be encompassed within the following claims.

It is claimed:

1. A method for heating, plurality of objects within a microwave cavity using microwave radiation, comprising:
   a) generating microwaves of a predetermined mode within a cylindrical cavity;
   b) determining a symmetric region within said microwave cavity where the microwave energy is relatively uniform;
   c) placing said plurality of objects in said relatively uniform region of the cavity thereby perturbations in the microwave energy; and
   d) arranging said plurality of objects within said region at specific locations where the perturbations of the microwave radiation caused by all of the objects will be approximately the same at each object location, whereby the amount of microwave energy absorbed by each object will be substantially the same.

2. A method as in claim 1 wherein said objects are dielectrics, and further comprising determining a region within the cavity where there is a relatively uniform electric field of the microwaves in the predetermined mode, and wherein said objects are arranged in locations within said region.

3. A method as in claim 1 wherein the samples are substantially electrical conductors, and further comprising determining a region within the cavity wherein there is a relatively uniform magnetic field of the microwaves in the predetermined mode, and wherein said objects are arranged in locations within said region.

4. A method as in claim 1 wherein the predetermined mode is configured such that each specific position is at an electric field or a magnetic field local maxima.

5. A method as in claim 4 wherein said samples are dielectrics and the amplitude of the electric field of the microwaves is at a maximum in said region.

6. A method as in claim 4 wherein said samples are conductors and said region is a region of maximum magnetic field strength.

7. A method as in claim 4 wherein the specific positions are symmetrically arranged with an identical angular separation from one another with respect to a symmetric axis of the cavity.

8. A method as in claim 7 wherein the sample-holding positions are disposed radially equidistant around the symmetric axis.

9. A method as in claim 1 wherein the predetermined mode includes a transverse magnetic (TM) mode.

10. A method as in claim 9 wherein the predetermined mode includes a $TM_{020}$ mode.

11. A method as in claim 1 further comprising making each sample in a shape of a cylinder.

12. A method as in claim 1 wherein the microwave energy in said cavity includes at least another predetermined mode.

13. A method as in claim 12 wherein less than four resonant modes of said microwaves are excited within the cavity.

14. A method of heating a plurality of samples in a microwave cavity generating microwaves having electric and magnetic fields, wherein said fields of microwaves within the cavity are distorted by each sample, comprising the steps of:
   selecting at least one predetermined mode of microwave energy to be generated in the cavity;
   determining a region in the cavity where the electric field of the microwave energy is substantially the same, in absence of samples in the region,
   selecting sample locations within the region to substantially equalize a cumulative distortion in the microwave energy caused by presence of all of the samples at each sample location;
   placing each sample at one of said locations; and
   applying microwaves to the cavity to heat each sample by an approximately identical amount of microwave energy.

15. The method of claim 14 wherein said samples are dielectrics and each sample is placed at a location where the microwave electric field is at a local maximum.

16. A method as in claim 14 when said sample extends over a region where said microwave electric field is approximately zero at the center of the sample and is highest within the sample near the outer surface of the sample.

17. A method of heating a plurality of samples in a microwave cavity generating microwaves having electric and magnetic fields, wherein said fields of microwaves within the cavity are distorted by each sample, comprising the steps of:
   selecting at least one predetermined mode of microwave energy to be generated in the cavity;
   determining a region in the cavity where the intensity of the magnetic field of the microwave energy is substantially the same, in absence of samples in the region,
   selecting sample locations within the region to substantially equalize a cumulative distortion in the microwave energy caused by presence of all of the samples at each sample location;

placing each sample at one of said locations; and applying microwaves to the cavity to heat each sample by an approximately identical amount of microwave energy.

18. The method of claim 17 wherein said samples are substantially electrical conductors, and wherein each sample is placed at a location where the microwave magnetic field is at a local maximum.

* * * * *